March 14, 1961  O. G. BURCH  2,975,224
METHOD AND APPARATUS FOR MELTING GLASS
Original Filed Oct. 1, 1954  5 Sheets-Sheet 1

INVENTOR.
OSCAR G. BURCH

March 14, 1961  O. G. BURCH  2,975,224
METHOD AND APPARATUS FOR MELTING GLASS
Original Filed Oct. 1, 1954  5 Sheets-Sheet 2

INVENTOR.
OSCAR G. BURCH

INVENTOR.
OSCAR G. BURCH

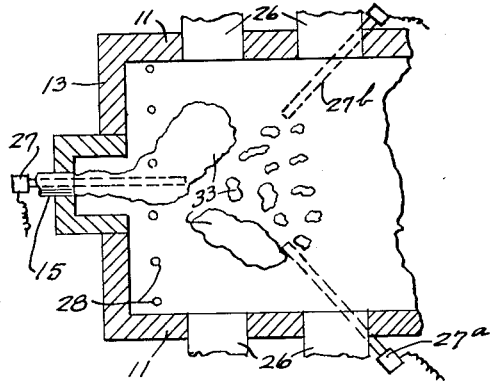
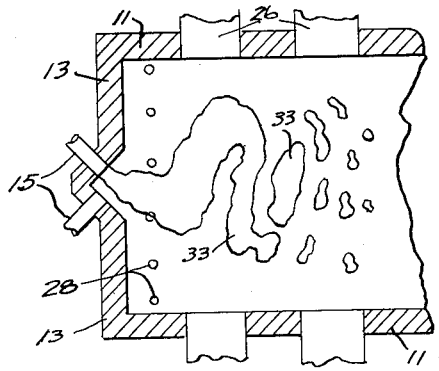
Fig. 9.   Fig. 10.
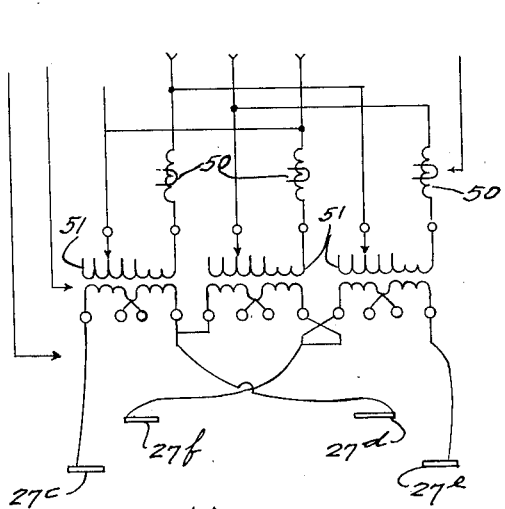
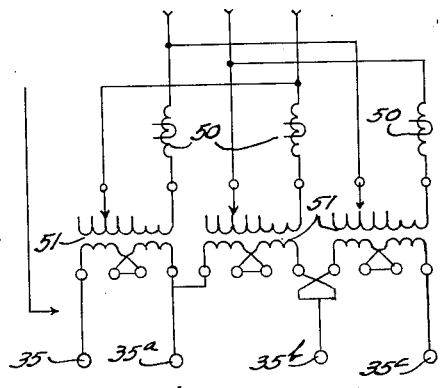
Fig. 11.   Fig. 12.
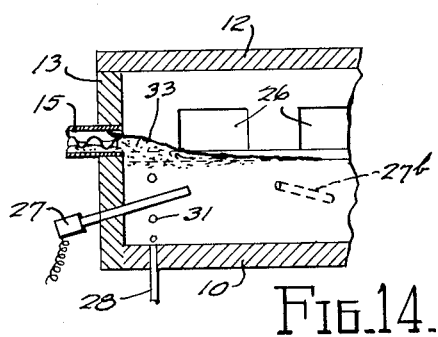
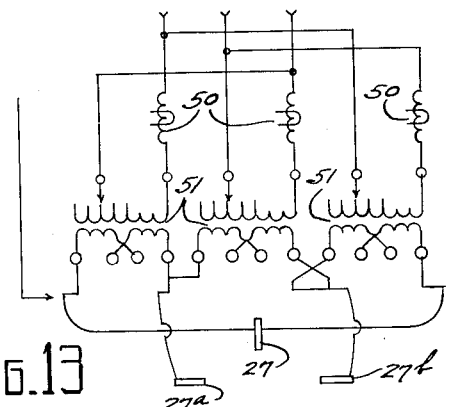
Fig. 14.   Fig. 13.
INVENTOR.
OSCAR G. BURCH March 14, 1961  O. G. BURCH  2,975,224
METHOD AND APPARATUS FOR MELTING GLASS
Original Filed Oct. 1, 1954  5 Sheets-Sheet 5

INVENTOR
OSCAR G. BURCH

United States Patent Office 2,975,224
Patented Mar. 14, 1961

2,975,224

METHOD AND APPARATUS FOR MELTING GLASS

Oscar G. Burch, Toledo, Ohio, assignor to Owens-Illinois Glass Company, a corporation of Ohio Continuation of application Ser. No. 459,588, Oct. 1, 1954. This application Feb. 27, 1959, Ser. No. 796,176

13 Claims. (Cl. 13—6)

The primary purpose of this invention is to provide an increase in the productive capacity of a glass melting tank together with an increased quality of the glass produced. This increase is to be accomplished by combining the action of two different heat sources, i.e., one being electrical and the other combustible fuel, used particularly in the melting of the glass, with the mechanical stirring action provided by a gaseous agent, such as air or inert gas passing in bubble form upwardly through the melting glass batch.

In this invention it is contemplated to provide a furnace or tank having interconnected glass containing compartments separated from each other by walls which are either submerged or otherwise, but each having a connection with its adjacent portion by which molten glass may pass from one to the other.

Also provided is means for feeding the raw batch materials into one end or one or both sides of the melting portion, either in stream, lump or blanket form, and further means is provided in said portion for stirring the glass both by mechanical and convection current action.

In connection with the latter-mentioned feature, it is contemplated by the present invention that stirring of the glass solely by mechanical means disclosed herein will contribute greatly toward the melting efficiency of the furnace, whether such furnace be heated solely by combustible gases or by the combination of combustible gases and electrical energy.

The heating means provided in this new arrangement is such that the melting batch and the resultant glass may be subjected to heat from both combustible gases and electrical energy both exteriorly and interiorly thereof respectively.

In the usual glass melting furnace, for example, one having a melting and refining area, with said melting area being of several hundred square feet, provided with reversing side or end port checker firing, it is found that it will produce certain colors of molten glass on a basis of approximately one ton per six square feet of melter area.

The simple addition of a submerged dam before the throat or passage leading from the melter, will provide a condition whereby such a furnace or tank, will produce molten glass on a basis of a ton of glass per several square feet of melter area.

The addition of certain electrical equipment to this same furnace will permit production of molten glass on a considerably smaller number of square feet of melter area and by adding bubblers, the square feet of melter area required per ton of glass produced is still further reduced. These increases of tons per square foot indicate an increase of productive capacity of approximately 35%, and actual production records indicate a considerable lowering percentagewise of off ware due to bad glass even with the increased tonnage production.

Among the objects of this invention, it is desired to provide a novel method and means for facilitating the melting and refining operations in a glass melting tank by producing a direction controlled and accelerated circulation of the glass in the tank in such a manner as to control both the convection and the created mechanical currents to promote a rapid melting and to reach the desired homogeneity in the melted glass in a shorter time period.

A more specific object of the invention is to provide means for mechanically accelerating the motion of the glass in the melting or other areas by the introduction of a fluid or bubble forming material or medium into the body of the molten glass in such areas. Preferably the bubbling material is introduced through the floor of the melter, thereby to generate a vertical plane of accelerated motion in the glass body causing thereby a more rapid approach to the desired homogeneity in the molten glass.

The vertical plane of motion causes a circular or elliptical convection current which not only improves homogeneity but moves the glass or batch from the colder portion of the furnace to the hotter portion, where it is exposed to the heat source, thus promoting more rapid melting. Depending on its location, the induced vertical plane of motion may be used to oppose an undesirable convection current which would normally be present without the bubblers.

A further object of the invention resides in the utilization of mechanical means acting within the mass of glass to facilitate movement of the glass and batch material from the colder portion of the furnace to the hotter portion thus promoting more rapid melting, and, in this connection to control batch distribution in the molten glass body by inhibiting its tendency to sink to the lower strata of glass in the furnace.

A still further object is to provide a further method and means whereby homogeneity in the glass body may be reached not only in greater volume but in shorter time intervals. This is accomplished by providing energized electrodes in various areas of the tank, but more specifically in the melter regions where acting in combination with the radiant heat applied to the surface areas of the glass, they produce convection current movement in the body of the glass. This in conjunction with and supplemented by the mechanical action produced by the bubbling means operates to produce a more homogeneous body of refined molten glass in greater volume and in shorter time intervals.

Another object is to utilize in combination, both combustion or radiant heating means and electrical heating means, respectively, externally and internally of the body of glass being melted, together with a mechanical means acting within the mass of glass to thereby provide a rapid increase in the movement of the glass in and through the heating areas to thereby obtain a rapid increase in temperature to insure that all of the oxides will be brought into solution and with a resultant increase in the tonnage of glass melted per square foot of melter area. Such combined heating also operates to control the movement of the glass forming the body of the mass.

A further object is to provide a greater movement of the entire body of glass in the melter area, particularly through the depth thereof, and thereby cause a greater uniformity of temperature conditions throughout the depth, width, and length of the molten mass in the melting portion.

Other objects will be apparent from the following descriptive matter.

In the drawings:

Fig. 9 is a plan view of an end portion of a melting tank showing a single type batch feed as well as electrodes through the side walls of the tank.

Fig. 10 is a plan view of an end portion of a tank showing the opposed type batch feeding.

Fig. 11 is a schematic wiring diagram of the electrical circuit for the tanks shown in Figs. 7 and 8.

Fig. 12 is a schematic wiring diagram of the electrical circuit for the center portion of the tank shown in Fig. 4.

Fig. 13 is a schematic wiring diagram of the electrical circuit for the tank shown in Fig. 3.

Fig. 14 is a part sectional elevational view showing the vertical location of the horizontal electrodes of the tank shown in Fig. 9.

Figure 16:
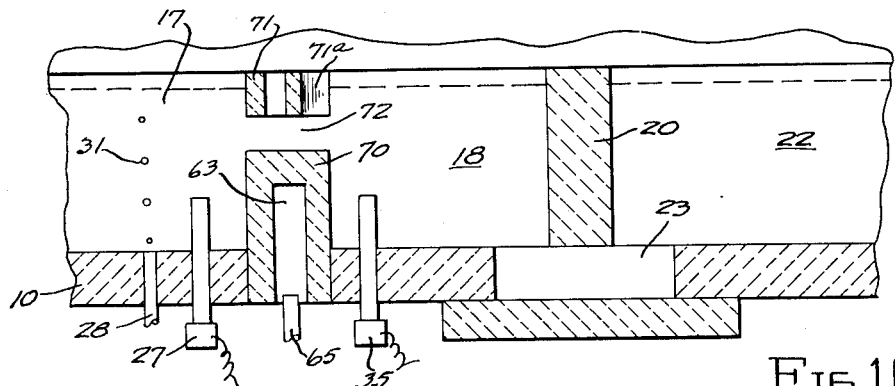

Fig. 16 also is a cross-sectional elevation taken at the longitudinal centerline of a tank showing a submerged opening through the dam.

Figure 17:
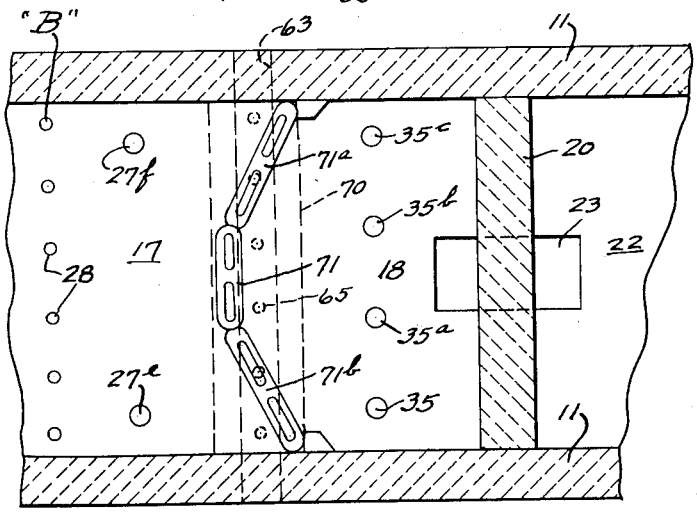

Fig. 17 is a plan view of the structure of Fig. 16 showing the relative arrangement of the dam, the bubblers and electrodes.

The present application is a continuation of my co-pending application, Serial No. 459,588, filed October 1, 1954; the latter-mentioned application being abandoned upon filing the present application.

Figure 1:
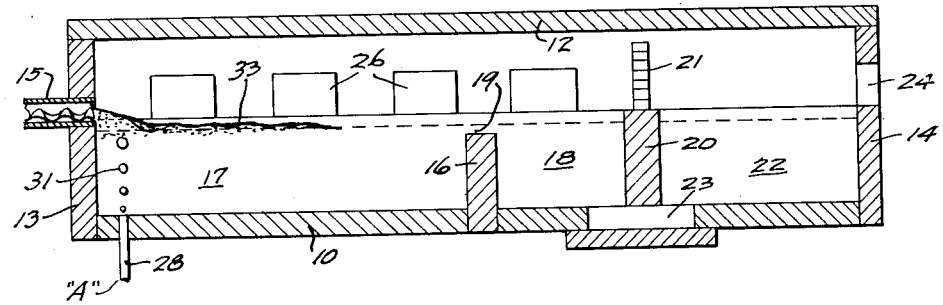
Fig. 1 is a longitudinal sectional elevation through a glass melting tank illustrating the combination of a submerged dam and bubblers.
Figure 2:
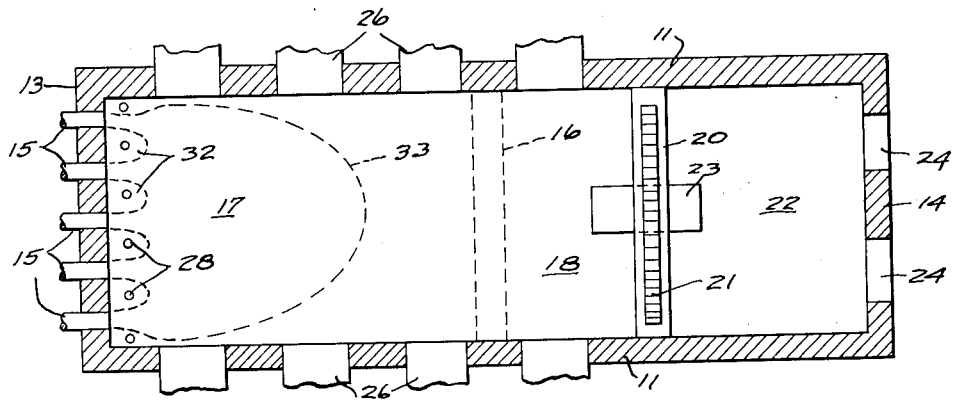
Fig. 2 is a plan view of the glass containing portion of a melting tank such as shown in Fig. 1.
Figure 3:
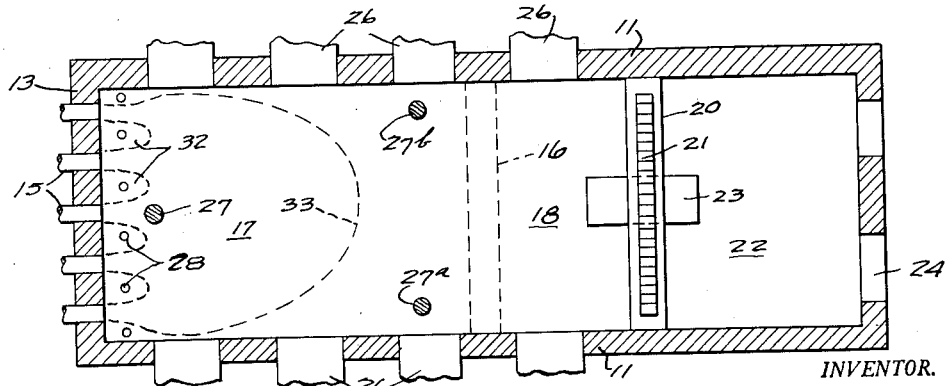
Fig. 3 is a plan view of a tank showing the addition of electrical equipment in equilateral triangular form.
Figure 4:
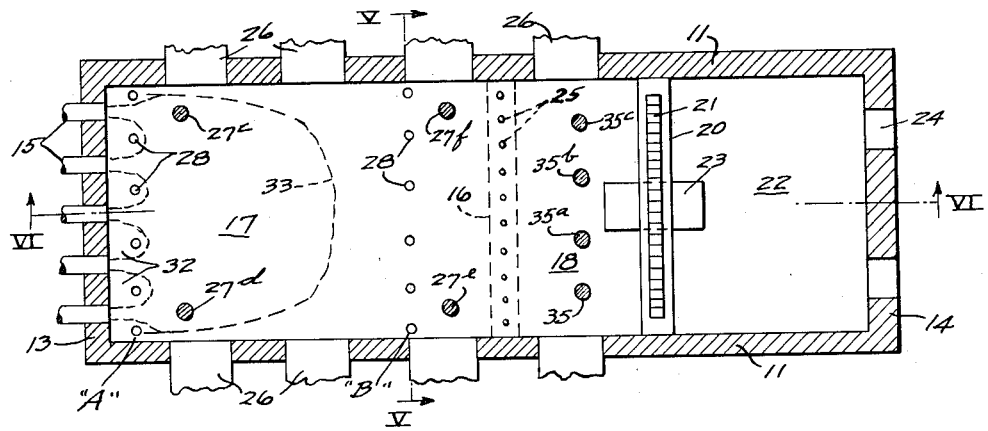
Fig. 4 is a plan view of a further arrangement of the temperature and current control members within a melting tank.
Figure 5:
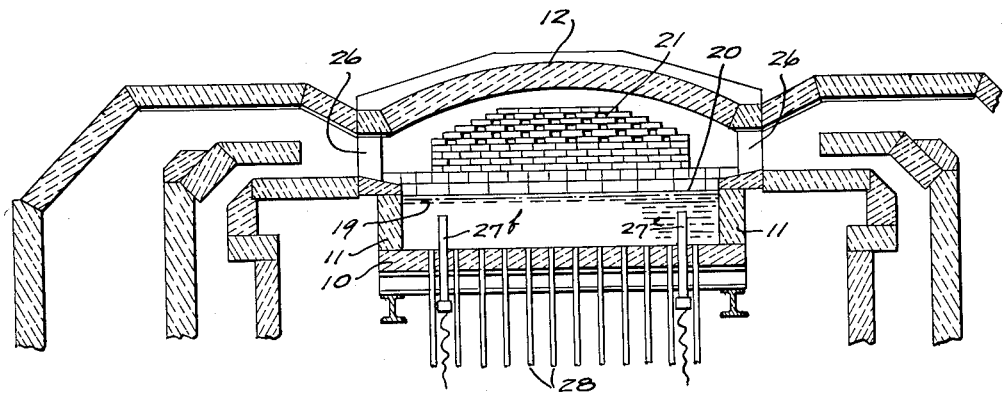
Fig. 5 is a cross-sectional elevation taken approximately at line V—V on Figs. 4, 6, 7 and 8.

Referring to Figs. 1–3, the tank, which may be generally of conventional construction, comprises a floor 10, side walls 11, a roof 12, and end walls 13 and 14, all made of refractory material. A submerged dam or bridge wall 16 separates the melting compartment 17 from the refining compartment 18, said compartments being in communication through the passage 19 extending above the submerged bridge wall 16. A series of pipes 25 supply cooling along the bottom of the dam 16 to thereby prolong its life use. A main bridge wall 20, with its complementary shadow wall 21, divides the refining and working compartments 18 and 22, respectively, but said compartments are in communication with each other through the passage 23 at the lower end of the bridge wall 20 and around the ends and over the top of shadow wall 21 as shown in Figs. 4 and 5. Passage 23 may be at any desired vertical level through the wall 20 or of the drop-throat type as shown.

Figure 15:
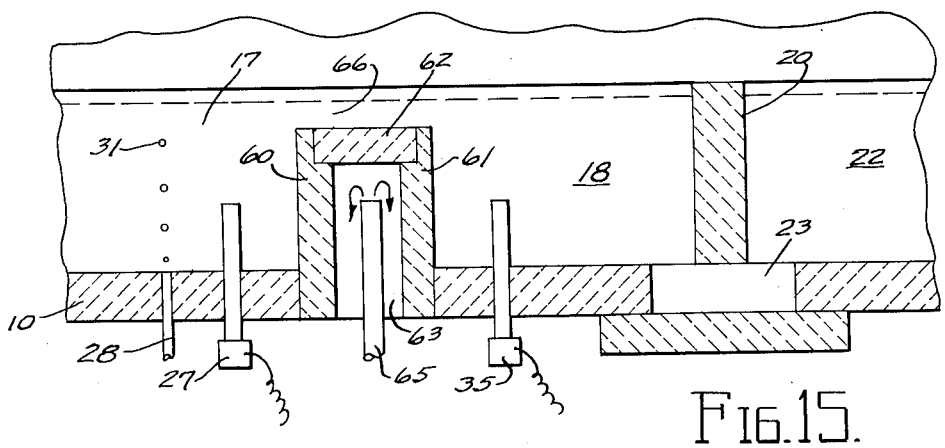
Fig. 15 is a cross-sectional elevational view taken on the longitudinal centerline of a tank showing a bridge-wall type structure as a dam.

Referring to Figs. 15, 16 and 17, modifications of the structure of the dam 16 are shown. In particular the structure of Fig. 15 is important for several reasons. In this particular structure the submerged dam is comprised of vertical walls 60 and 61 with a cap block 62 forming thereby a hollow structure having an opening 63 therein which extends through the full width of the tank and which is open at the bottom and at both ends or sides of the tank.

Projecting up into opening 63 is a series of cooling pipes 65 which are adapted to blow cooling air upon the outer surface areas of the walls 60 and 61 and the cap block 62. This cooling is provided only to prolong the life of the blocks.

By providing this opening or gap 63 in this submerged dam, the electrical currents from electrodes 27 and 35 are prohibited from passage through the walls and are forced to travel through the molten glass and over the dam through passage 66. In particular is this true when a circuit is provided which involves the electrodes positioned upon opposite sides of the dam. A row of bubblers 28 is provided in front of the dam and the electrodes 27 to modify the convection currents in that area.

A further modification of the structure of the dam is shown in Fig. 16 wherein the submerged portion 70 extends through the bottom blocks of the floor of the tank and is cooled by pipes 65. Positioned immediately above the submerged dam 70 is a floating dam 71, 71a and 71b which in cooperation with the portion 70 provides a submerged opening 72 for passage of the molten glass. If in this particular structure an electrical circuit is provided as between the electrodes 27 and 35, the path of electrical energy will be through the opening 72.

The several portions 71, 71a and 71b of the floating dam may be interchanged to provide control of the size of the opening 72.

Fig. 17 illustrates the particular arrangement of the bubblers 28, the electrodes 27 and 35 and the dam 71 with respect to each other.

The electrical circuits with respect to the electrodes 27 and 35 may be other than a circuit which passes the electrical energy over or through the dam as will be set forth hereinafter.

The raw batch materials may be introduced through openings in either the end or sidewalls, but the means for introducing said material is here shown as batch feeders 15 in the end wall 13. These materials are melted and refined to some extent as they advance slowly through the compartment 17. The molten metal or glass then passes through the passage 19 above the submerged bridge wall 16 into the refining chamber 18 where it is further refined and conditioned before it is withdrawn or discharged to the working chamber 22. Work openings 24 are provided in the end wall 14 from which the molten refined glass may be taken in any of the known conventional manners.

A blanket of radiant heat for melting the glass is supplied from regenerators (not shown) for which hot gases are discharged through ports 26 which open into the melting compartment above the level of the glass, said ports being arranged at intervals along both sides of the furnace.

In addition to the blanket of radiant heat supplied through ports 26, there is provided a plurality of electrodes 27 which provide electrical heat in and through the mass of glass in the several glass containing compartments. These electrical elements also aid in the control and production of the convection currents engendered in the body of the glass as will be more fully disclosed hereinafter.

As a component part of the invention, there is provided a series of pipes 28 or lines which lead to and extend upwardly through the floor of the furnace and through which a fluid medium is discharged in the form of bubbles liberated at regulated and controlled intervals within the molten glass. These pipes may be of cast iron or other metal, alloy or refractory material resistant to the action of the molten glass and the high temperatures involved.

The fluid or gas as it flows upward through the pipe 28 forms a bubble 31 within the molten glass at the mouth of the tube, the size of the bubble being dependent primarily on the surface tension of the glass and in a measure on the shape of the tube or conduit at its discharge end. When the bubble reaches a certain size it will break loose from the end of the tube and commence to rise toward the surface of the glass. This upward movement of the bubble causes the comparatively viscous molten glass which envelops it to move upward therewith. This upward pull or movement of the glass may be confined mainly to that portion of the glass immediately adjoining the bubble.

The gas or fluid supplied by each pipe is liberated within the glass in a succession of bubbles 31 formed at intervals which may be controlled and regulated by regulating the pressure. These bubbles, which may be substantially spherical when released from the pipe 28, gradually expand as they rise and are also flattened out before they are discharged at the surface of the glass.

In the normal feeding of glass batch to the usual melting furnace, it will be found that the batch fills rather solidly down the end wall 13 to the bottom wall 10 and apparently the major portion thereof remains there or only small portions move slowly therefrom. Because of this condition this end and bottom portion runs comparatively cold. Such a condition can be obviated by and through the proper use of the bubblers 28 and regenerators (not shown) adapted to work in combination to provide both mechanical and convection current circulation as set forth hereinafter.

The pipes 28 are preferably arranged in rows A and/or B extending transversely of the furnace, these rows being at right angles to the general direction of movement of the glass through the furnace. One row of pipes A enters through the furnace floor at a position in front of and between and beneath each of the batch feeders 15. Row B enters through the furnace floor at a position before the submerged dam 16. It will be seen that with rows of pipes thus arranged and discharging gas bubbles at short intervals, there will be a continuous upward movement of these bubbles, all in a substantially vertical plane and distributed at short intervals throughout the area of the glass within such plane. Thus there is mechanically produced a rising path of molten glass extending through the width of the tank and which is drawn upwardly with the gas bubbles. As a result the partially melted material which would ordinarily be sluggish or dormant, so far as travel along or adjacent to the bottom of the furnace may be concerned, is forced to move upward toward the top surface of the glass where the higher furnace temperature and greater fluidity of the glass allow a comparatively rapid release of the entrapped gases. Thus these unmelted or partially unmelted portions of batch material are subjected to the higher temperatures to materially aid in speeding the melting and fining process.

At the same time this movement of the glass in the form of a rising curtain serves to prevent a rapid and continuous movement of the surface glass and batch materials directly from the charging end of the furnace toward the fining chamber 18. The action is also such as to prevent complete stagnation of the lower strata of glass in the furnace and to insure the thorough mixing of the materials during the melting process while at the same time directing and supplementing the convection currents and preventing the formation of cords, streaks and other conditions which would result in lack of homogeneity in the final workable glass mass. This controlled circulation of glass in accordance with the present invention also accelerates the melting and refining operations and results in a substantial saving in fuel and an increased productive capacity.

The bubbles which are liberated within the glass may be comparatively large and will break upon reaching the surface of the glass. The particular type of fluid or gas used may vary, depending on whether it is desired to use an oxidizing, a reducing or a neutral gas for the purpose of reacting on the glass. For example, where the glass batch contains iron, an oxidizing gas may be used for oxidizing the iron. A reducing gas may be used to retain certain coloring compounds. A neutral gas may be employed where it is desired to avoid any changes in the state of the chemical contents comprised in the glass, and such gas may be supplied through pipes from a tank or reservoir in which the gas is stored under pressure although the invention is not to be considered as limited to the use of gas in this form. Gas-forming elements or compounds as, for example, air under pressure, water, ammonium nitrate, ammonium sulphate, sodium chloride, arsenic and other materials which readily form gaseous type bubbles, may be satisfactorily used where such materials are delivered under properly controlled condition.

The rate of flow of fluid or gas may be varied throughout a rather wide range. In commercial operations I have obtained satisfactory results with rates of flow ranging from as low as six bubbles per minute released from each line, up to 100 or more. The most satisfactory rate of flow depends upon variable factors met with in the melting and fining operations such as size of the tank, depth of the glass, composition of the glass batch, temperatures to which the glass is subjected during melting and fining as well as other factors.

Attention is directed to the row A of the bubbler pipes 28 and in particular to their location with respect to the individual batch feeders 15. It will be noted that these bubblers are so located that as the bubbles form and rise to the surface of the glass they appear on the surface in an area 32 of molten glass between each batch feeder. One purpose in having such an arrangement is to avoid any possible blowing of the dust of the batch mixture upwardly into the flame area of the tank, and thus cause rapid deterioration of the refractory members which would be exposed to such dust. These bubblers need not be located exactly midway between the batch feeders.

Referring in particular to Figs. 1 and 2, there is disclosed therein the combination of bubblers 28, ports 26 and the submerged dam 16. With this particular combination, the batch materials are prevented from accumulating at the rear end wall 13 by the bubblers 28 and are forced to come up into the high temperature surface zone portion where they are more rapidly and individually subjected to such temperature. This will permit a more rapid melting of these materials because a greater activity in convection currents will exist through the length of the melter portion 17.

The submerged dam acts also in the capacity of forcing the glass to the surface areas where it is again subjected to the high temperature provided by the ports 26.

Because of this mechanical and convection current activation, the glass moving along the melter reaches a point of approximately complete fusion or melting in front of the dam 16, and because the top surface area is the hottest, then only the hottest melted glass will flow through passage 19 into compartment 18.

Although this above described combination does increase the tonnage melted, it is of course desirable to obtain the greatest tonnage possible per square foot of melter area. As a consequence, a combination such as just described but including additional heat supplied internally of the glass provides the means whereby the ultimate in homogeneity of the glass and in tonnage melted may be acquired.

For example, the combination of bubblers 28, ports 26, dam 16, and electrodes 27 will provide the desirable increase in melting, motion and fining of the glass. With the row A of bubblers 28 positioned between the end wall 13 and the electrodes 27 and 27a, a vertical plane of motion is caused in the melting glass and the batch is thus prevented from settling down along the end wall 13 and to the bottom of the furnace. This gives a much higher wall temperature on the bottom blocks and insures movement of the major portion of the batch and molten glass away from this end of the furnace.

This row of bubblers A acting in conjunction with the electrodes 27, 27a and 27b (Fig. 3) provides a highly activated movement in the glass in this end of the furnace, this action being the result of the convection currents generated in the glass mass by the radiant heat of the ports 26 and the electrodes 27, 27a and 27b supplemented by the mechanical motion provided through the vertical plane of motion of the bubbles 31.

Because of this accentuated motion, all of the batch materials are more rapidly and in greater volume subjected to the radiant heat from the ports 26 and that supplied by the electrodes 27, 27a and 27b. This results in the melting of a given quantity of glass in a much shorter time period than is usual in a normal furnace structure and operation.

With the batch being fed to this end of the furnace by a series of feeders 15 there is thus effected what might be termed a blanket 33 of such batch mixture moving over the upper surface of the melting end of the furnace 17 and extending part way through the length of the melting portion of the furnace. In those instances where a single batch feeder 15 or a pair of batch feeders, such as illustrated in Figs. 9 and 10 respectively, may be utilized it will also be found that the major portion of the batch tends to form small separate lumps or individual blankets 33. In such situations the current agitation produced by the bubblers 28 and the sidewall or floor electrodes 27, 27a and 27b will hasten the melting down of the raw materials in such lumps or blankets 33.

In Fig. 13 there is diagrammatically shown the electrical circuit for the electrode arrangement disclosed in Fig. 3. As shown, it is a 3-phase circuit with saturable reactors, etc., and adapted to automatically adjust the voltage, current and/or power in accordance with erosion and/or corrosion of the electrodes.

Referring particularly to Fig. 3, it will be noted that immediately before the dam 16 are electrodes 27a and 27b arranged near the side walls of the tank, while electrode 27 is positioned near end wall 13, thus forming with electrodes 27a and 27b an approximately equilateral triangle arrangement. These electrodes in combination with the radiant heat on the surface of the glass mass provide a path of high temperature, between the blanket of batch 33 and the dam 16, to create a convection current motion which restrains the flow of any of the unmelted batch material over the dam 16 and through passage 19.

The melted glass as it reaches the area of the electrodes 27a and 27b in front of the submerged dam 16, is subjected to such further temperature increases as may be required to bring the molten mass into a state of refinement that is almost complete. Also, it is contemplated that these electrodes will raise the temperature of the mass to a degree of temperature which is compatible with the high rate of tonnage that will be drawn from a furnace of this type. Thus, only the hottest glass will pass over the dam through passage 19 into the compartment 18.

As the molten mass enters into the compartment or chamber 18 (Figs. 2 and 3), it may be then subjected only to radiant heat and will be permitted to reach a condition of refinement which is free from bubbles. Subsequently the mass flows through the passage 23 into the working chamber 22 from which it is taken for processing through work openings 24.

With this above described arrangement of combined radiant and electrical heating, together with the bubblers at the batch feeding end, it is possible to operate at a productive capacity of approximately a ton of molten glass per 4.5 sq. ft. of melter area.

Figure 6:
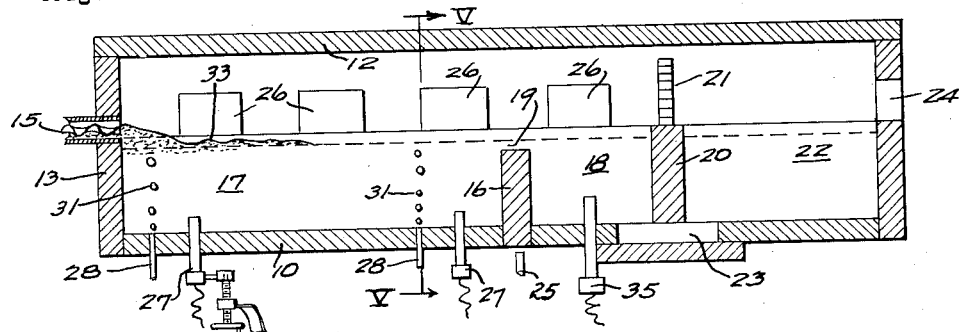
Fig. 6 is a longitudinal sectional elevation through a glass melting and fining tank embodying the novelties of this present invention.
Figure 7:
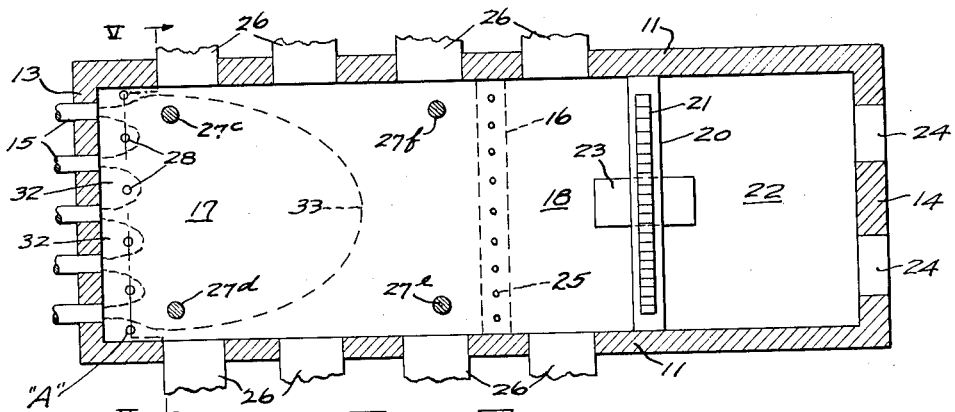
Fig. 7 is a plan view showing one arrangement of the members for controlling the current motion of the body of glass in a glass melting tank.
Figure 8:
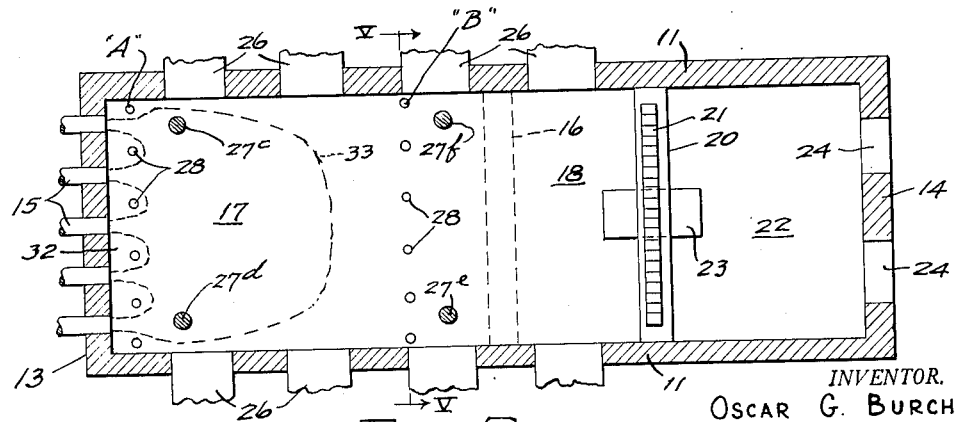
Fig. 8 is a plan view of a further arrangement of the members adapted to control the motion of the body of glass in a melting tank.

Referring in particular to Figs. 6 and 8, it will be noted that a second row B of bubblers has been positioned in front of the dam and before the electrodes 27e and 27f. This particular row of bubblers B thus provides through the width of the tank, a second vertical plane of motion starting from the bottom wall of the furnace and moving towards an upper surface area of the body of glass. In addition, this vertical plane of movement apparently causes the glass to move in a path away from the electrodes and toward the rear of the furnace, and thereby increases the distance as between the dam 16 and the unmelted or blanket portions of batch 33 on the surface of the glass in the melting portion 17 of the tank.

In addition, a further arrangement of the electrodes 27c, 27d, 27e and 27f provide a path of convection current motion which is accentuated by the vertical plane of motion provided by row B of bubblers 28, thereby causing the glass in this particular area to move with great rapidity into positions to be repeatedly contacted by the two heating means and thus have all its mass rapidly subjected to the heat both from the radiant heating as well as that supplied by the electrodes. The glass at this point may be at an extremely high temperature, and because of the row of bubblers B and electrodes 27c to 27f, only the fully melted glass will then pass over the dam 16 and through passage 19 into the conditioning chamber 18.

It should be apparent that with such an arrangement, that is, with the two rows A and B of bubblers 28 and two groups or sets of electrodes 27c, 27d, 27e and 27f providing rapid motion in the mass of glass that the complete melting of the batch can be accomplished in a very short period of time, and the needed high temperatures can be reached very rapidly. Thus, with a very heavy pull of molten glass through the work openings 24, the required tonnage of glass batch may be melted on an extremely low basis of sq. ft. per ton, and it can be fined with sufficient rapidity to meet any tonnage required to be drawn from the tank.

In Fig. 11, a typical diagram is shown as used with electrodes 27c through 27f. In this particular diagram a 3-phase, 3-wire power source supplies a saturable reactor 50 and multi-ratio transformer in each phase. The secondary windings of each transformer 51 are connected to a pair of electrodes. The primary windings of each transformer 51 are connected in series with the saturable reactor 50 to the power source. The saturable reactor 50 provides a means for conveniently adjusting the voltage applied to the primary of the furnace transformer and consequently the voltage applied to the electrodes connected to the transformer secondary windings. The saturable reactor 50 may have its control winding connected to devices which provide a control signal proportional to the voltage, current, power and/or combination thereof, applied to the electrodes or to the temperature of the glass in the volume between electrodes or flowing towards the electrodes, thus automatically regulating the temperature of the glass and/or voltage, current, and/or power of the electrical energy applied in order to attain the most efficient conditions for melting and fining the glass and to compensate for electrode erosion and/or corrosion.

The combination of multi-ratio transformer and saturable reactor or other type of voltage variator, permits complete regulation of the voltage applied to the groups of electrodes 27 or 35 for melting of glasses of widely different composition and electrical resistivity.

Electrodes for Figs. 3, 4, 6–9 and 14 may be of graphite, molybdenum or other refractory metals or conducting materials which are not rapidly attacked or made soluble by the glass. As illustrated in Fig. 6, the electrodes 27 may be adjustably mounted through the use of any well-known adjusting means to permit regulation of the length of contact as between any electrode and the molten glass.

In Figs. 4 and 6, there is disclosed the same type of compartmentized furnace but in the conditioning chamber 18 a group or series of electrodes 35, 35a, 35b and 35c are positioned behind the dam 16 and in a row extending through the width of the furnace and before the opening of passageway 23 leading to the working compartment 22. The addition of these electrodes in this chamber 18 permits the glass in this portion to be subjected to highly active convection current motion as well as any desired temperature condition conducive to the rapid elimination of any gas bubbles and to the increase in temperature that will be needed in the case of excessively high tonnage pull from the working chamber 22. In Fig. 12 is shown a circuit basically identical to that of Fig. 11, with each multi-ratio transformer connected to a pair of adjacent electrodes. In this particular arrangement there is thus provided means whereby external and internal heat are provided for both the melted and fined glass. The electrical circuit for electrodes 27c to 27f is the same as that shown in Figs. 7, 8, and 11 and may be controlled independently of the circuit of Fig. 12, i.e., the electrodes 35 to 35c.

In the particular arrangement of Fig. 4, there are provided three zones of convection current activity between the point where the batch is fed into the furnace and where it enters into the working chamber as workable molten glass. At least two of these zones are supplemented by a mechanical gaseous means, namely, the rows A and B of bubblers 28, which accentuate the speed of motion of the glass in a vertical plane and through this means the temperature of the body or mass of glass in the compartments 17 and 18 becomes more nearly equalized and uniform throughout its depth, width, and length.

Thus, with the combination of bubblers, gas ports and electrodes as illustrated in Figs. 4, 5, and 6, there is provided the ultimate in combining mechanical and convection current motion in the molten mass, and consequently all portions of the mass will more rapidly reach the maximum temperature and more rapidly bring the oxides into solution. Thus a greater tonnage withdrawal of melted and refined glass is obtainable in a minimum time interval. This arrangement permits the input of B.t.u. into the mass to be upon a basis in proportion with tonnage pull upon the furnace or tank, and to also increase the tonnage melted and worked per sq. ft. of melter area.

In applying electric power simultaneously to the heating zones on both sides of the dam 16, 60 or 70, care must be exercised with certain refractories and/or glass compositions to connect the transformers for these two zones with the proper polarity and to the proper phases so that the difference in voltage between electrodes on opposite sides of the dam, 27f to 35c and 27e to 35 for example, will not be of such magnitude to cause a high enough leakage current between these opposite electrodes and through the glass flowing over the dam or through the refractory material of the dam itself to superheat ("boil") the glass or melt the refractory dam, respectively. With other glass compositions and/or suitable refractory material for construction of the dam, such that the leakage current will substantially flow only in the glass above the dam (rather than through the dam itself), this leakage current can be used to advantage in the fining of the glass; since the depth of the glass over the dam is very shallow, thus a seed or glass bubble will have a very short vertical distance to rise and burst. By attaining a high temperature in this shallow section of glass the viscosity of the glass is reduced permitting a much faster rate of rise of gas bubbles and the decreased surface tension permits the bubble to break much more rapidly when it reaches the surface.

From the preceding descriptive matter, it will be found that the several combinations therein disclosed all tend to increase the quality and quantity of molten glass produced from a tank in any given time period.

For example, the first combination of radiant surface heat, a submerged dam and bubblers will measurably increase quality and quantity.

The second combination of radiant surface heat, electric heat interiorly of the mass, a submerged dam and bubblers will further increase the tonnage melted per sq. ft. of melting area and improve the quality.

The third combination of radiant heat, a submerged dam, electric heat on both sides of the dam, bubblers in front of the dam and interiorly of the mass will still further enhance quantity and quality, and the fourth combination which includes radiant heat, a submerged dam, electric heat on both sides of the dam and over the dam and bubblers before the dam will provide immeasurable increase in the quantity and quality of glass melted and worked in a given time period.

The terms "fluid" and "gas" as used herein are interchangeable in their scope and meaning as the use of either comprehends that the medium may be actually of fluid or gas form.

Modifications may be resorted to within the spirit and scope of my invention.

I claim:

1. The method of converting a mixture of basic glass making materials to a workable molten mass in a glass working tank having melting, fining and working areas which comprises the steps of initially feeding such a mixture to the melting portion of said tank, applying heat to said mixture during its progress through all said tank areas to form therefrom a molten mass of workable glass, said heat being applied to both exterior and interior portions of said mass during its progress through at least one of said tank areas, subjecting said mass to convection current agitation during said heating, and modifying and accelerating said agitation by introduction of a gaseous means beneath the area of admission of said mixture.

2. The method in accordance with claim 1, wherein the exterior and interior heating occurs concurrently with the accelerated agitation.

3. A furnace for the continuous production of molten glass through the combined heat developed by electrical energy and combustible fuels, comprising a compartment type furnace having at least two interconnected glass containing compartments, molten glass in each compartment, a portion of one compartment being so constructed as to melt raw materials, means to blanket feed raw materials along the end of said portion, means to apply radiant heat over the entire surface area of the glass, a plurality of interconnected and energized electrodes in said compartment arranged in combination with said radiant heat to subject the glass in said compartment to convection current motion, at least one of said electrodes being beneath the said blanket of raw materials and adjacent to a side wall of the compartment, means to regulate the surface area of glass contact as between at least one electrode and the glass, means to automatically maintain a constant voltage to said electrode as the surface area of glass contact thereof changes, and at least one gaseous introduction means modifying and supplementing the convection current motion of the glass beneath the blanket of and at the area of admission of said raw materials.

4. A furnace for the continuous production of molten glass through the combined heat developed by electrical energy and combustible fuels, comprising a compartment type furnace having at least two interconnected glass containing compartments, molten glass in each compartment, a portion of one compartment being constructed and arranged to melt raw materials, means to blanket feed raw materials over the surface of the glass and across the major portion of the end width of said portion, a second portion of said compartment constructed and arranged to fine the glass, means to apply radiant heat over the entire surface area of the glass, a plurality of electrodes in said compartment arranged in combination with said radiant heat to subject the glass in said compartment to convection current agitation, at least one of said electrodes being beneath the said blanket of raw materials and adjacent to a sidewall of the compartment, means to adjust the lineal contact as between at least one electrode and the glass, means to automatically maintain the voltage constant with respect to said lineal contact adjustment, and a plurality of gaseous introduction means supplementing the convection currents and operable to prevent accumulation of raw materials beneath the raw material feeding area.

5. A furnace for the continuous production of molten glass through the combined heat developed by electrical energy and combustible fuels, comprising a compartment type furnace having a plurality of interconnected glass containing compartments, molten glass in each compartment, one of said compartments being constructed and arranged for the combined melting and fining of glass, means to feed raw materials through the end of said compartment, means to apply radiant heat over the entire surface area of the glass, a plurality of electrodes in said compartment arranged in combination with said radiant heat to subject the glass in said compartment to convection current motion in a vertical plane through the width of the furnace and beneath said raw materials, at least two of said electrodes being at a level beneath that of said raw materials and with each adjacent to a side wall of the compartment, means to adjust the lineal contact as between each individual electrode and the glass, means automatically maintaining the voltage constant in respect to said lineal contact adjustment, and a plurality of gaseous introduction means beneath the said raw materials operable to cause motion of the glass in a vertical plane through the width of the melting compartment and between said first mentioned vertical plane of motion and an end wall of said compartment.

6. A furnace for the continuous production of molten glass through the application to raw glass making materials of the combined heat developed by electrical energy and combustible fuels, comprising a compartment type furnace having at least two interconnected glass containing compartments, molten glass in each compartment, means to apply radiant heat over the entire surface area of the glass, a portion of one compartment being constructed and arranged to melt the raw materials, means to feed the raw materials along the end of said portion, a plurality of electrodes in said compartment arranged in combination with said radiant heat to subject the glass in said compartment to convection current agitation in vertical planes along the side and end walls thereof, at least one of said electrodes being beneath the point of admission of said raw materials and adjacent to a side wall of the compartment, means to vary the surface area contact as between at least one electrode and the glass, a plurality of rows of gaseous introduction means modifying the convection current motion of the glass in said compartment and one of said rows being positioned along the end of said melting portion and beneath the area of admission of said raw materials.

7. A furnace for the continuous production of molten glass through the combined heat developed by electrical energy and combustible fuels, comprising a compartment type furnace having at least two interconnected glass containing compartments, molten glass in each compartment, means to apply radiant heat over the entire surface area of the glass, a portion of one compartment being constructed and arranged to melt raw materials, means to blanket feed raw materials over the surface of the glass and across the end width of said portion, a second portion of said compartment constructed and arranged to fine the glass, a plurality of electrodes in said compartment arranged in combination with said radiant heat to subject the glass in said compartment to convection current agitation, said electrodes being beneath the said blanket of raw materials and adjacent to the side walls of the compartment, means to adjust the lineal contact as between said electrodes and the glass, a plurality of rows of gaseous introduction means arranged for modifying the convection currents and operable to supplement motion of the glass and one of said rows being beneath the blanket of raw materials and along the outer end wall of the melting portion of the furnace.

8. A furnace for the continuous production of molten glass through the combined heat developed by electrical energy and combustible gases, comprising a compartment type furnace having a plurality of interconnected glass containing compartments, molten glass in each compartment, means to apply radiant heat over the entire surface area of the glass, one of said compartments being constructed and arranged for the combined melting and fining of glass, means to blanket feed raw materials through the end width of said compartment, a plurality of electrodes in said compartment arranged in combination with said radiant heat to subject the glass in said compartment to convection current agitation in vertical planes, at least two of said electrodes being beneath said blanket of raw materials with each adjacent to a side wall of the compartment, said two electrodes arranged to generate a convection current in a vertical plane beneath said blanket, means to adjust the lineal contact as between each individual electrode and the glass, and a mechanical gaseous introduction means operable to cause motion of the glass in a vertical plane extending through the width of the melting compartment along the end wall thereof and beneath the area of admission of the blanket of raw materials.

9. A furnace for the continuous production of molten glass through the combined heat developed by electrical energy and combustible fuels, comprising a compartment type furnace having at least two interconnected glass containing compartments, molten glass in each compartment, the first portion of one compartment being constructed and arranged to melt raw materials, a plurality of means disposed along the end wall of said compartment and constructed and arranged to feed raw materials over the surface of the glass and across the major end width of said first portion, a plurality of electrodes in said compartment arranged in combination with said radiant heat to subject the glass in said compartment to convection current agitation, a pair of said electrodes being disposed beneath the point of admission of said raw materials and adjacent to a side wall of the compartment, means to automatically maintain the voltage constant with respect to any lineal contact change between said electrodes and the glass, means to provide a blanket of radiant heat over the exposed upper surface area of the glass in each said compartment, and gaseous introduction means disposed between each two points of admission of raw materials beneath the area of admission of raw materials and operable to cause motion of the glass in a vertical plane parallel to and along said end wall.

10. A furnace for the continuous production of molten glass through the combined heat developed by electrical energy and combustible fuels, comprising a compartment type furnace having at least two interconnected glass containing compartments, means to provide a blanket of radiant heat over the exposed upper surface area of the glass in each said compartment, molten glass in each compartment, a portion of one compartment being constructed and arranged to melt raw materials, means to blanket feed raw materials along the end of said portion, a plurality of electrodes in said compartment arranged in combination with said radiant heat to subject the glass in said compartment to convection current agitation, at least one of said electrodes being beneath the said blanket of raw materials and adjacent to a side wall of the compartment, means operable automatically to maintain a constant voltage to said electrode as the surface area of glass contact thereof changes, and a plurality of gaseous introduction means paralleling said blanket feed means and constructed and arranged for modifying and supplementing the convection current motion of the glass beneath the area of admission of the blanket of raw materials.

11. A furnace for the continuous production of molten glass through the combined heat developed by electrical energy and combustible fuels, comprising a compartment type furnace having a plurality of interconnected glass containing compartments, molten glass in each compartment, means to provide a blanket of radiant heat over the exposed upper surface area of the glass in each said compartment, one of said compartments being constructed and arranged for the combined melting and fining of glass, means to blanket feed raw materials through the end width of said compartment, a plurality of electrodes in said compartment arranged in combination with said radiant heat to subject the glass in said compartment to convection current agitation, two of said electrodes being beneath said blanket of raw materials with each adjacent to a side wall of the compartment, means to maintain the voltage constant in respect to any lineal contact change as between the glass and any electrode, and gaseous introduction means positioned between the said two electrodes and an end wall of the compartment operable to cause accelerated motion of the glass in a vertical plane along said end wall and through the width of the compartment and beneath the feeding point of the blanket of raw materials.

12. A furnace for the continuous production of molten glass through the application to raw glass making materials of the combined heat developed by electrical energy and combustible fuels, comprising a compartment-type furnace having at least two interconnected glass containing compartments, molten glass in each compartment, means to provide a blanket of radiant heat over the exposed upper surface area of the glass in all said compartments, a portion of one compartment being constructed and arranged to melt the raw materials, means arranged to feed the raw materials adjacent the end of said portion, a submerged dam in said compartment spaced from the said melting portion, a plurality of energized electrodes in said compartment arranged in combination with said radiant heat to subject the glass in said compartment to convection current agitation, said electrodes being beneath the level of said raw materials, before said dam and adjacent to the side walls of the compartment, said electrodes being so interconnected as to form a path of electrical energy parallel to both said dam and side walls, automatic means to maintain the voltage constant with respect to variations in the surface area contact as between the electrodes and the glass, and gaseous introduction means disposed along said end wall and constructed and arranged for modifying the convection current motion of the glass beneath the point of admission of the raw materials.

13. A furnace for the continuous production of molten glass through the combined heat developed by electrical energy and combustible fuels, comprising a compartment-type furnace having at least two interconnected glass containing compartments, molten glass in each compartment, a first portion of one compartment being constructed and arranged to melt raw materials, a plurality of batch feeding means constructed and arranged to blanket feed raw materials over the surface of the glass and across the end width of one end of said first portion, a second portion of said compartment constructed and arranged to fine the glass, a submerged dam in said compartment spaced from said melting portion and dividing said first and second compartment portions, means to provide a blanket of gaseous radiant heat over the exposed upper surface area of the glass in each said compartment, groups of electrodes in said compartment portions arranged in combination with said radiant heat to subject the glass in said compartment portions to convection current agitation, one group of said electrodes being beneath the said blanket of raw materials and adjacent to the side walls of the compartment, a second group of electrodes before said dam and adjacent the side walls of the compartment, a further group of electrodes behind said dam and adjacent an end wall of a compartment, means interconnecting at least two of said groups of electrodes into a circuit of electrical energy, the electrodes adjacent the opposite sides of said dam being interconnected to pass electrical energy therebetween and angularly over the dam, means to adjust the lineal contact as between at least one electrode and the glass, means to maintain the voltage constant with respect to variations in the surface area contact as between the electrodes and the glass, gaseous introduction means disposed on opposite sides of each batch feeding means and extending through the width of the compartment beneath the area of admission of the blanket of raw materials and adjacent the end wall of the melter, a further gaseous introduction means adjacent the dam and beneath the surface of the glass, and both said gaseous introduction means constructed and arranged to cooperate with at least a pair of electrodes to modify the convection currents and to supplement the motion of the glass.

References Cited in the file of this patent

UNITED STATES PATENTS

| Number | Name | Date |
| --- | --- | --- |
| 1,741,977 | Cornelius | Dec. 31, 1929 |
| 2,263,549 | Peyches | Nov. 18, 1941 |
| 2,274,643 | Adams | Mar. 3, 1942 |
| 2,277,679 | Borel | Mar. 31, 1942 |
| 2,331,052 | Shadduck | Oct. 5, 1943 |
| 2,387,222 | Wright | Oct. 16, 1945 |
| 2,636,913 | Lambert | Apr. 28, 1953 |
| 2,636,914 | Arbeit | Apr. 28, 1953 |
| 2,658,095 | Arbeit et al. | Nov. 3, 1953 |

FOREIGN PATENTS

| Number | Country | Date |
| --- | --- | --- |
| 19,777 | Great Britain | of 1891 |
| 611,401 | Great Britain | Oct. 28, 1948 |
| 629,811 | Great Britain | Sept. 28, 1949 |